US008903925B2

(12) United States Patent
Li et al.

(10) Patent No.: US 8,903,925 B2
(45) Date of Patent: Dec. 2, 2014

(54) SCHEDULED MESSAGES IN A SCALABLE MESSAGING SYSTEM

(75) Inventors: Bin Li, Sammamish, WA (US); Kartik Paramasivam, Redmond, WA (US); Manu Srivastava, Redmond, WA (US); SeongJoon Kwak, Sammamish, WA (US); Venkata Raja Gopal Ravipati, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 271 days.

(21) Appl. No.: 13/470,928

(22) Filed: May 14, 2012

(65) Prior Publication Data
US 2013/0304826 A1    Nov. 14, 2013

(51) Int. Cl.
*G06F 15/16*    (2006.01)
*H04L 12/56*    (2006.01)

(52) U.S. Cl.
USPC ................ 709/206; 709/232; 370/395.4

(58) Field of Classification Search
None
See application file for complete search history.

(56) References Cited

U.S. PATENT DOCUMENTS

| | | | |
|---|---|---|---|
| 4,790,003 A | 12/1988 | Kepley et al. | |
| 6,438,217 B1 | 8/2002 | Huna | |
| 6,950,502 B1 | 9/2005 | Jenkins | |
| 7,016,367 B1 * | 3/2006 | Dyckerhoff et al. | 370/429 |
| 7,876,788 B2 * | 1/2011 | Elliot | 370/503 |
| 8,068,429 B2 * | 11/2011 | Rittmeyer et al. | 370/241 |
| 2001/0008530 A1 * | 7/2001 | Okamoto | 370/428 |
| 2002/0052218 A1 * | 5/2002 | Rhee | 455/552 |
| 2003/0133466 A1 * | 7/2003 | Shimonishi | 370/412 |
| 2007/0064883 A1 | 3/2007 | Rosenthal et al. | |
| 2008/0263564 A1 | 10/2008 | Gambino | |
| 2009/0144385 A1 * | 6/2009 | Gold | 709/206 |
| 2009/0311992 A1 | 12/2009 | Jagetiya | |
| 2011/0235642 A1 * | 9/2011 | Dyckerhoff et al. | 370/392 |

OTHER PUBLICATIONS

Vasters, Clemens, "Introducing the Windows Azure AppFabric Service Bus May 2011 CTP", Retrieved at <<http://blogs.msdn.com/b/appfabric/archive/2011/05/13/introducing-the-windows-azure-appfabric-service-bus-may-2011-ctp. aspx>>, May 13, 2011, pp. 3.
"JBoss Messaging 2.0 User Manual", Retrieved at <<http://docs.jboss.org/jbossmessaging/docs/usermanual-2.0.0.beta4/html_single/index.html>>, Retrieved Date: Dec. 21, 2011, pp. 117.

* cited by examiner

*Primary Examiner* — Joshua Joo
(74) *Attorney, Agent, or Firm* — Ben Tabor; Kate Drakos; Micky Minhas

(57) ABSTRACT

Techniques are provided for scheduled and non-scheduled delivery of messages. A message directed to at least one consumer is received at a message entity. The message is determined to include a scheduled delivery time. The received message is stored in a scheduled sub-queue of the message entity. Activation metadata is retrieved and stored for any messages stored in the scheduled sub-queue that include a scheduled delivery time within a predetermined upcoming time period. If when the message is received, the scheduled delivery time of the message is within a current activation window, the activation metadata for the message may be extracted and stored immediately. The stored activation metadata is analyzed to determine a batch of messages in the scheduled sub-queue ready for delivery. The determined batch of messages is stored in an active sub-queue of the message entity, to be ready for delivery at the request of a consumer.

20 Claims, 8 Drawing Sheets

SCHEDULED MESSAGES IN A SCALABLE MESSAGING SYSTEM

BACKGROUND

Various types of messaging systems exist that enable the exchange of digital messages from a message author to one or more recipients. Examples of such messaging systems include electronic mail (e.g., email or e-mail), instant messaging, and text messaging. Some messaging systems, including email, operate across the Internet or other computer network(s). Many messaging systems are based on a store-and-forward model, where a messaging server accepts, stores, and delivers messages. In such systems, neither the sender nor recipient needs to be online simultaneously.

In the vast majority of messaging systems, messages are immediately available for consumption as soon as they are provided by the message author. In other words, as soon as the messaging server receives a message, the messaging server transmits the message to the recipient(s) with as little delay as possible.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for scheduled and non-scheduled delivery of messages. A scheduled message is a message that is scheduled for future delivery at or after a specified delivery time. Scheduled messages may be stored in a scheduled sub-queue, while messages that are ready for delivery may be stored in an active sub-queue, or the scheduled messages and ready for delivery messages may be handled in other ways. The scheduled messages may be processed for delivery after time delays defined by their corresponding specified delivery times. Offline communication patterns are thereby enabled such that the parties involved in a message communication do not need to be online at the same time.

In one method implementation, a message is received at a message entity from a publisher. The message is determined to include a scheduled delivery time. The received message is stored in a scheduled sub-queue of the message entity. Activation metadata is retrieved for any messages stored in the scheduled sub-queue that include a scheduled delivery time within a predetermined upcoming time period. The retrieved activation metadata is stored in memory. The stored retrieved activation metadata is analyzed to determine a batch of messages in the scheduled sub-queue ready for delivery. The messages of the determined batch of messages are then moved to an active sub-queue of the message entity (e.g., are "activated").

In one implementation, the received message may be directed to a single consumer associated with the message entity (e.g., the message entity may be a single consumer queue). A request for messages may be received at the message entity from the consumer. Any messages in the active sub-queue may be transmitted to the consumer in response to the request (e.g., including transmitting the received message to the consumer).

In another implementation, the received message may be directed to a topic to which a plurality of consumers subscribes (e.g., subscribers). When the message is activated, the message may be moved to an active sub-queue of the message entity associated with the topic, and an indication of the received message may be stored in each of a plurality of subscriber queues associated with the message entity corresponding to the plurality of consumers subscribing to the topic. A request for messages may be received at a particular subscriber queue from a consumer corresponding to the particular subscriber queue. One or more messages indicated in the subscriber queue corresponding to the consumer may be transmitted to the consumer in response to the request.

A messaging system is also provided. The messaging system includes a first message entity, a memory, an activation metadata retrieval agent, and an activation agent. The first message entity includes a message sorter, a scheduled sub-queue, and an active sub-queue. The message sorter stores received messages that include a scheduled delivery time in the scheduled sub-queue. The message sorter stores received messages that do not include a scheduled delivery time in the active sub-queue. The scheduled sub-queue includes durable storage that stores received messages for the scheduled sub-queue. The activation metadata retrieval agent retrieves activation metadata for any messages stored in the scheduled sub-queue that include a scheduled delivery time within a first predetermined upcoming time period. The activation metadata retrieval agent stores the retrieved activation metadata in the memory. The activation agent analyzes the stored retrieved activation metadata to determine a batch of messages in the scheduled sub-queue scheduled for delivery in a second predetermined upcoming time period. The activation agent stores the determined batch of messages in the active sub-queue.

In an implementation, the first message entity may be configured for messages directed to a single consumer, for one or more consumers. The active sub-queue of the message entity (queue message entity) transmits any messages in the active sub-queue directed to a particular consumer to the particular consumer in response to a request for messages from the particular consumer.

In another implementation, the first message entity may be configured for messages directed to a topic that a plurality of subscribers subscribes to. In such an implementation, the active sub-queue of the message entity associated with the topic may be associated with a plurality of subscriber queues corresponding to the plurality of consumers. When a message directed to the topic is activated, the activation agent stores an indication of the message in the active sub-queue associated with the topic. An indication of the message may then be provided to each of the plurality of subscriber queues associated with the topic message entity. The consumers may access the message in their subscriber queues. For instance, the consumer corresponding to a particular subscriber queue may access the particular subscriber queue to receive the message (and receive further messages stored in the subscriber queue that were directed to the topic).

The messaging system may include one or more additional message entities that handle scheduled and non-scheduled messages for consumers. The additional message entity(s) is/are each coupled to the activation metadata retrieval agent and the activation agent. The additional message entity(s) each include a corresponding message sorter, a corresponding scheduled sub-queue, and a corresponding active sub-queue.

Computer program products containing computer readable storage media are also described herein that store computer code/instructions for enabling the scheduled delivery of messages, as well as enabling additional embodiments described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
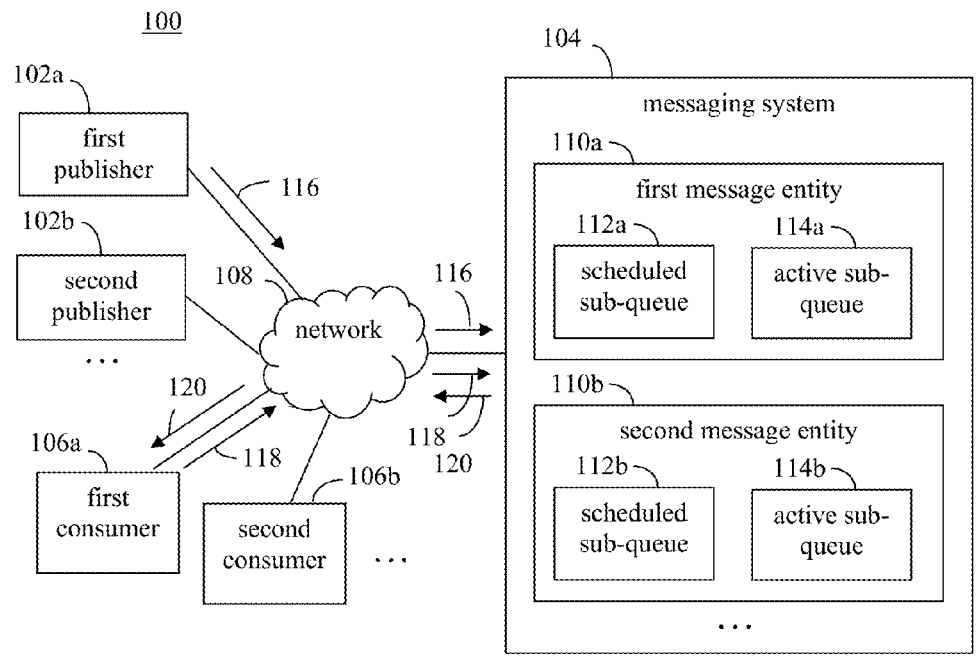
FIG. 1 shows a block diagram of a messaging environment in which scheduled and non-scheduled delivery of messages are enabled, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments of the present invention are described as follows. It is noted that any section/subsection headings provided herein are not intended to be limiting. Embodiments are described throughout this document, and any type of embodiment may be included under any section/subsection.

II. Example Embodiments

In the vast majority of messaging systems, messages are immediately available for consumption (e.g., are ready to be sent to a recipient for reading/viewing) as soon as they are published (sent by a message sender). According to embodiments, scheduled delivery enables messages to become available for consumption after a specified date/time, rather than being transmitted to recipients without delay. Such a message that is scheduled for future delivery may be referred to as a "scheduled message." A process of making a scheduled message available for consumption may be referred to as "activation."

In an embodiment, a scalable messaging system enables hosting of an arbitrarily large number of message queues used in applications owned by different tenants, each of which may handle forwarding of an arbitrarily large number of scheduled messages. Such a messaging system may be referred to as a "multi-tenant messaging system" when multiple message queues are hosted that are separate from each other, and that each correspond to different sets of one or more consumers. Each tenant (consumer set) may view the messaging system as being exclusively for the tenant (e.g., the tenants do not cross paths). Scheduled messages may be received at various times, and may be delivered at the same time or at different times. In an embodiment, reliable activation is enabled, such that scheduled messages are guaranteed to be delivered even if there are system crashes or overload. Furthermore, high throughput may be enabled, which is the ability to handle an arbitrarily large burst of scheduled messages without overwhelming the messaging system. Still further, within a particular message queue, messages may be delivered in the order that they are received (an "in order guarantee").

Embodiments enable an offline communication pattern through the use of queues, such that the parties involved in a message communication do not need to be online at the same time. Furthermore, the scheduling of messages allows messages, such as purchase orders, to be processed for delivery after a time delay defined by a scheduled delivery time (e.g., when money is available in an account, etc.).

Various embodiments may provide various further features. For instance, in an embodiment, activation information of about-to-expire scheduled messages may be loaded into memory, while the remaining scheduled messages are stored durably in data stores (in durable storage). This reduces memory consumption when activating a large number of scheduled messages. "Durable storage" refers to storage that is capable of storing data for long periods of time, and is configured to be resistant to data loss (e.g., due to system crashes, natural disasters, etc.), such as through the use of data backup techniques including one or more of redundant storage, remote backup, data mirroring, etc. Examples of computer storage media that enable such long term storage include magnetic tapes, hard disks, optical storage, non-volatile memory devices, etc.

Furthermore, scheduled messages may be activated in batches to reduce resource usage and enable large throughput. The handling of short schedule time messages may be optimized to reduce activation latency for such messages. Mechanisms may be implemented to maintain in order delivery, such that scheduled messages are delivered in the same order that they are published to the message entity. Reliable support may be provided for arbitrarily long scheduled messages, such that long schedule time messages may be stored durably, and their activation may be retried until delivery is successful or all other delivery options are exhausted. Still further, un-activated scheduled messages may be counted towards a quota of a message queue.

Such embodiments may be implemented in a variety of environments. For instance, FIG. 1 shows a block diagram of a messaging environment 100, according to an example embodiment. As shown in FIG. 1, environment 100 includes first and second publishers 102a and 102b, a messaging system 104, first and second consumers 106a and 106b, and a network 108. Environment 100 is provided as an example embodiment, and embodiments may be implemented in alternative environments. Environment 100 is described as follows.

Publishers 102a and 102b are configured to send messages, and consumers 106a and 106b are configured to receive and process messages. Messaging system 104 is an intermediary that handles the forwarding of messages sent by publishers 102a and 102b to consumers 106a and 106b. Publishers 102a and 102b and consumers 106a and 106b may each be any type of stationary or mobile computing device, including a desktop computer (e.g., a personal computer, etc.), a mobile computer or computing device (e.g., a Palm® device, a RIM Blackberry® device, a personal digital assistant (PDA), a laptop computer, a notebook computer, a tablet computer (e.g., an Apple iPad™), a netbook, etc.), a mobile phone (e.g., a cell phone, a smart phone such as an Apple iPhone, a Google Android™ phone, a Microsoft Windows® phone, etc.), or other type of stationary or mobile device.

In an embodiment, publishers 102a and 102b may be separate entities from consumers 106a and 106b. In another embodiment, a publisher and a consumer may be included in a same computer system, including being in a same single device or in a set of computing devices that are managed by a same entity. In such case, the combination of a publisher and a consumer may be referred to as a "client" that can both send messages to and receive messages from a messaging system. For instance, in one embodiment, publisher 102a may be a front-end system of a computer system of an entity, and first consumer 106a may be a back end system of the computer system of the entity. An example of such a client that may include both a publisher and a consumer is an online retailer/ecommerce site (e.g., www.amazon.com, operated by Amazon.com, Inc. of Seattle, Wash.). With regard to an online retailer, first publisher 102a may be a front-end system for receiving orders input by customers (e.g., through a browser interface). The input orders may be transmitted to messaging system 104 in the form of messages. Consumer 106a may be a back-end system of the online retailer for processing the received orders when the orders are transmitted in messages from messaging system 104.

Two publishers 102a and 102b and two consumers 106a and 106b are shown in FIG. 1 for purposes of illustration. However, any number of publishers 102 and consumers 106 may be present in environment 100, including tens, hundreds, thousands, and even greater numbers of publishers 102 and/or consumers 106.

Messaging system 104 is a messaging service that aggregates a collection of message entities, and makes the message entities available to users in a distributed messaging system. Messaging system 104 may be implemented in one or more computing devices, including one or more servers, which may be any type of computing device described herein or otherwise known that is capable of enabling the corresponding functionality described herein.

Publishers 102a and 102b, messaging system 104, and consumers 106a and 106b are communicatively coupled by network 108. Network 108 may include one or more communication links and/or communication networks, such as a PAN (personal area network), a LAN (local area network), a WAN (wide area network), or a combination of networks, such as the Internet. Publishers 102a and 102b, messaging system 104, and consumers 106a and 106b may be communicatively coupled to network 108 using various links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

As shown in FIG. 1, messaging system 104 includes first and second message entities 110a and 110b. Message entities 110a and 110b are message entities that provide support for one or more messaging patterns. Although two message entities are shown included in messaging system 104 in FIG. 1, any number of message entities 110 may be present in messaging system 104, including tens, hundreds, thousands, and even greater numbers of message entities. In an embodiment, message entities 110a and 110b are each queues for messages directed to corresponding to consumers. For instance, one or both of message entities 110a and 110b may be a queue for messages from first publisher 102a, second publisher 102b, and/or further publishers that are each directed to a single consumer, such as first consumer 106a or second consumer 106b. A message entity that handles messages directed to single consumers (single-consumer messages) is referred to as a single-consumer queue. Such a message entity may handle single-consumer messages for one or more consumers. In another embodiment, one or both of message entities 110a and 110b may be a queue for messages directed to a topic. For instance, message entity 110a may be a queue for messages from first publisher 102a, second publisher 102b, and/or further publishers that are directed to a topic to which both first consumer 106a and second consumer 106b subscribe.

Each of first and second message entities 110a and 110b may be configured to handle scheduled messages and non-scheduled messages. For example, as shown in FIG. 1, first message entity 110a includes a scheduled sub-queue 112a and an active sub-queue 114a, and second message entity 110b includes a scheduled sub-queue 112b and an active sub-queue 114b. Scheduled sub-queues 112a and 112b are configured to store messages for their respective message entities that have scheduled times for delivery until near their scheduled delivery time, at which point they are moved to active sub-queues 114a and 114b. Active sub-queues 114a and 114b are configured to store messages for their respective message entities that are ready to be delivered. For instance, first consumer 106a may at any point in time request any messages stored in active sub-queue 114a to be delivered to first consumer 106a. In response to such a request, any messages stored in active sub-queue 114a are delivered to first consumer 106a by messaging system 104.

Figure 2:
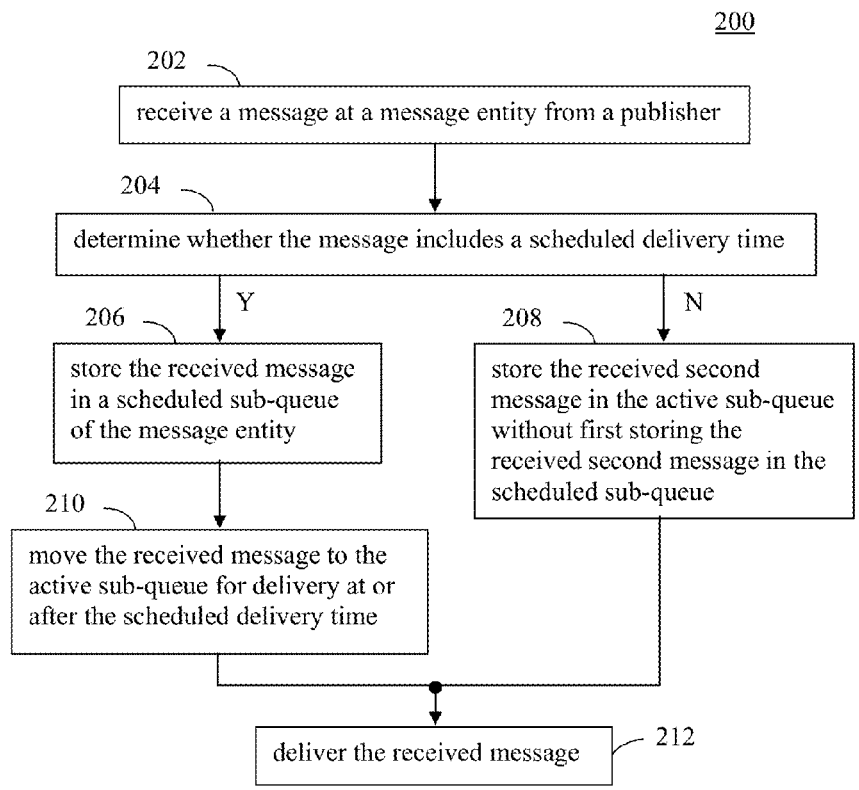
FIG. 2 shows a flowchart providing a process for scheduled and non-scheduled delivery of messages, according to an example embodiment.

Messaging system 104 may perform its functions in various ways, in embodiments. For instance, FIG. 2 shows a flowchart 200 providing a process for scheduled and non-scheduled delivery of messages, according to an example embodiment. In an embodiment, flowchart 200 may be performed by messaging system 104 of FIG. 1. Flowchart 200 is described as follows with reference to FIG. 1. Further structural and operational embodiments will be apparent to persons skilled in the relevant art(s) based on the following discussion regarding flowchart 200.

Flowchart 200 begins with step 202. In step 202, a message is received at a message entity from a publisher. For example, as shown in FIG. 1, a message 116 may be generated by first publisher 102a. Message 116 is a user defined series of octets (eight bit units of digital information) that contains business/application specific data and optional metadata. For instance, message 116 may include order information input by a user for a product and/or service for purchase, such as a product number, a number of items, payment information (e.g., credit card information, etc.), mailing information (e.g., mailing address), and/or may include other information. Message 116 may also be referred to as an "application message" or a "user message." Message 116 may have any suitable format, including having a header and a body.

For instance, a user at publisher 102a may interact with an interface (e.g., a graphical user interface, a web service interface, etc.) to generate message 116 by filling out a form, typing in text, providing gestures, providing voice, etc., and to address/direct message 116 to a single consumer queue or a topic (having multiple consumer subscribers). Alternatively, message 116 may be generated and directed to a single consumer or a topic automatically (e.g., by an application). If message 116 is generated as a scheduled message, a scheduled delivery time is indicated in message 116. For instance, a scheduled delivery time property (e.g., "ScheduledEnqueueTimeUtc") may be included in message 116 (e.g., in a header or other location) that has a value of a particular desired delivery time, or the scheduled delivery time may be indicated in message 116 in another manner. The scheduled delivery time may be indicated by a user at publisher 102a in the form of a time and date (e.g., a time at which a monetary account of the user will have enough money to cover a purchase indicated in message 116, etc.). Alternatively, the scheduled delivery time may be provided automatically. Otherwise, message 116 is generated as an unscheduled message (no scheduled delivery time value).

For purposes of illustration, an example of code that may be included in message 116 to provide as scheduled delivery time is provided below:

BrokeredMessage message=new BrokeredMessage( ) message. ScheduledEnqueueTimeUtc=new DateTime(2012, 02, 01, 10, 00, 00, Utc); message Sender.Send(message);

In this example, "BrokeredMessage" is an object model that describes a message, and includes a property "ScheduledEnqueueTimeUtc" that specifies a time of 10 am on Feb. 1, 2012 UTC (Coordinated Universal Time) after which the message can be delivered.

As shown in FIG. 1, message 116 may be transmitted from publisher 102a in a communication signal through network 108 to be received by messaging system 104. The communication signal may be transmitted in any form, including in the form of a stream of data/signal packets, etc. A particular message entity of messaging system 104 may be configured to receive messages directed to the single consumer or topic indicated in message 116, such as message entity 110a. In such case, message 116 is directed to the particular message entity for processing.

Referring back to FIG. 2, operation proceeds from step 202 to step 204. In step 204, whether the message includes a scheduled delivery time is determined. In an embodiment, first message entity 110a may parse message 116 to determine whether message 116 includes a scheduled delivery time. For instance, first message entity 110a may parse message 116 for a property (e.g., "ScheduledEnqueueTimeUtc") or other indication of a scheduled delivery time. If a scheduled delivery time is determined to be included in message 116, operation proceeds to step 206. If a scheduled delivery time is not determined to be included in message 116, operation proceeds to step 208.

In step 206, the received message is stored in a scheduled sub-queue of the message entity. For example, if message 116 is determined to include a scheduled delivery time, message 116 may be stored in scheduled sub-queue 112a of first message entity 110a. Operation proceeds to step 210.

In step 208, the received second message is stored in the active sub-queue without first storing the received second message in the scheduled sub-queue. For example, if message 116 is determined to not include a scheduled delivery time, message 116 may be stored directly in active sub-queue 114a of first message entity 110a. Operation proceeds to step 212.

In step 210, the received message is moved to the active sub-queue for delivery at or after the scheduled delivery time. In an embodiment, when the scheduled delivery time included in message 116 has passed, message 116 may be moved to active sub-queue 114a. Various embodiments for performing step 210 are described in the next subsection. Operation proceeds to step 212.

In step 212, the received message is delivered. Because message 116 is stored in active sub-queue 114a, message 116 is ready for delivery to consumer 106a. As shown in FIG. 1, in an embodiment, first consumer 106a may transmit a request 118 to messaging system 104. Request 118 is a request for any messages stored in active sub-queue 114a to be delivered to first consumer 106a. For instance, in an embodiment, request 118 may include an identifier for first consumer 106a. As shown in FIG. 1, in response to such a request, messaging system 104 may determine that first consumer 106a corresponds to active sub-queue 114a (e.g., by the identifier for first consumer 106a being associated with active sub-queue 114a). Messaging system 104 may transmit delivered message(s) 120 to first consumer 106a in a communication signal, which travels through network 108. Delivered message(s) 120 includes message 116, and may include further messages that were stored in active sub-queue 114a in addition to message 116, if any. The communication signals carrying request 118 and message 120 may be transmitted in any form, including as streams of data/signal packets, etc.

As such, embodiments enable the scheduled and non-scheduled delivery of messages. The embodiments of FIGS. 1 and 2 may be implemented in various ways to enhance the delivery of scheduled and non-scheduled messages. Examples such implementations are described in the following subsections.

A. Example Embodiments for Queuing Scheduled Messages Based on Activation Metadata As described above, in an embodiment, activation information (e.g., activation metadata) of scheduled messages stored in a scheduled sub-queue that are nearing their scheduled delivery times may be loaded into memory, in preparation for the scheduled messages being transferred into the active sub-queue for delivery. The activation metadata for a scheduled message is less than an entirety of message. Thus, by loading activation information into memory rather than the scheduled messages in their entirety, memory space can be conserved.

Figure 3:
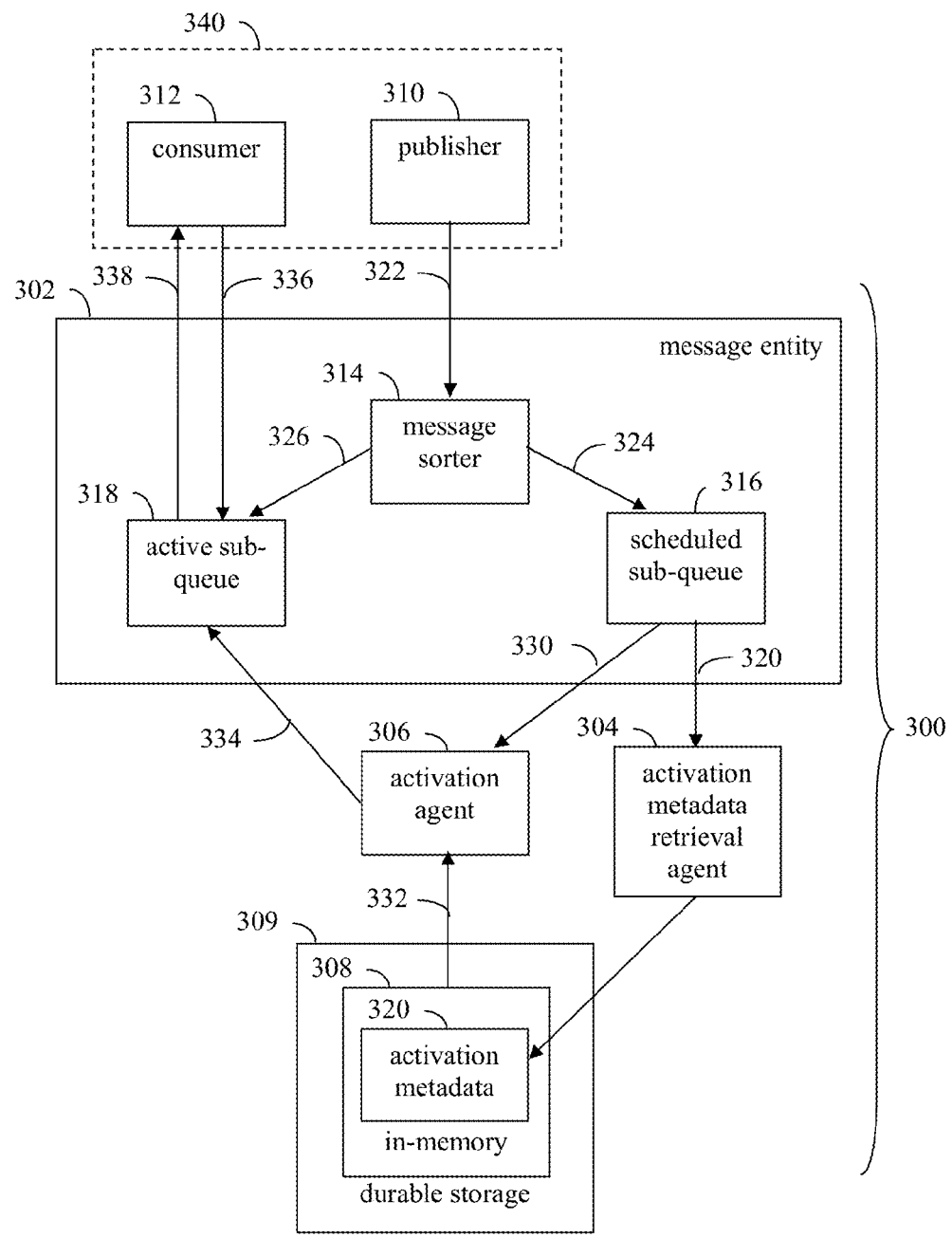
FIG. 3 shows a block diagram of a messaging system that enables delivery of scheduled and non-scheduled messages, and utilizes activation metadata of the scheduled messages to enhance operation, according to an example embodiment.

Such an embodiment may be implemented in various ways. For instance, FIG. 3 shows a block diagram of a messaging system 300 that enables delivery of scheduled and non-scheduled messages, and utilizes activation metadata of the scheduled messages to enhance operation, according to an example embodiment. Messaging system 300 is an example of messaging system 104 shown in FIG. 1. As shown in FIG. 3, messaging system 300 communicates with a publisher 310 and a consumer 312, both of which may be optionally included in a client 340. Furthermore, messaging system 300 includes a message entity 302, an activation metadata retrieval agent 304, an activation agent 306, and a durable storage 309 (that includes in-memory 308). Still further, in the example of FIG. 3, message entity 302 includes a message sorter 314, a scheduled sub-queue 316, and an active sub-queue 318. Note that example of message entity 302 shown in FIG. 3 is provided for purposes of illustration, and is not intended to be limiting. In other embodiments, message entity 302 may be configured in different ways from FIG. 3 (e.g., in other ways than including scheduled sub-queue 316 and active sub-queue 318) to deliver scheduled and non-scheduled messages.

Figure 4:
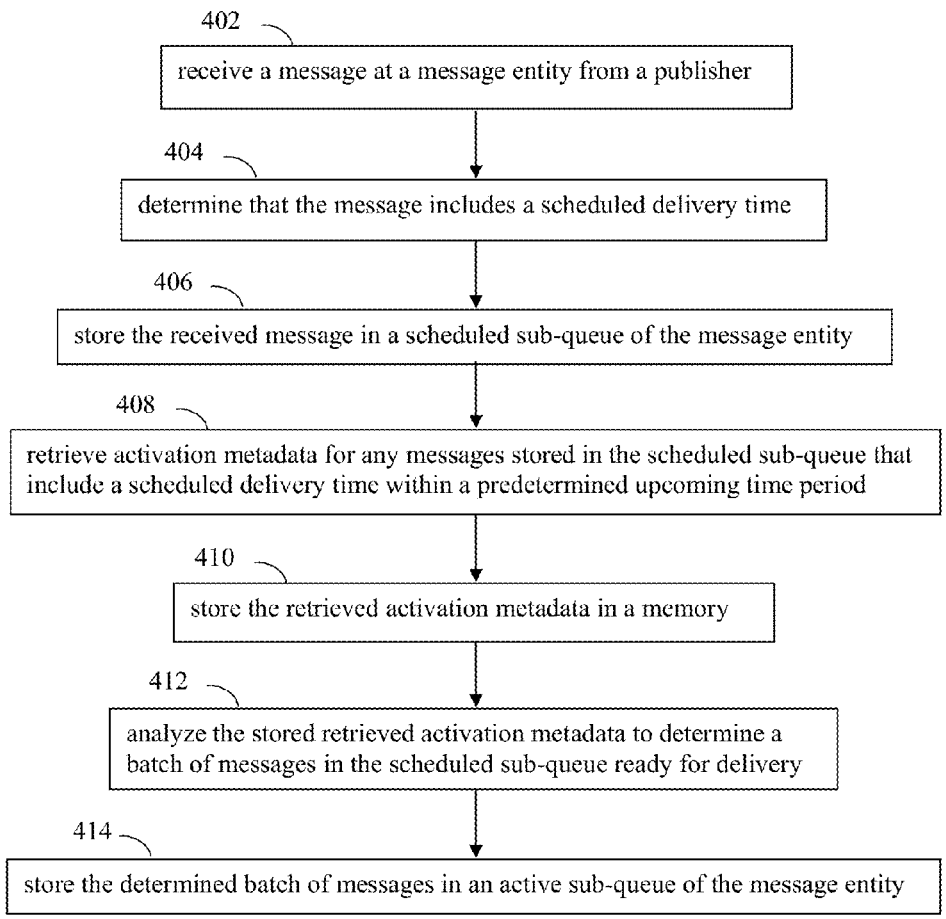
FIG. 4 shows a flowchart providing a process for scheduled and non-scheduled delivery of messages utilizing activation metadata of the scheduled messages, according to an example embodiment.

For purposes of illustration, messaging system 300 is described as follows with reference to FIG. 4. FIG. 4 shows a flowchart 400 providing a process for scheduled delivery of messages utilizing activation metadata, according to an example embodiment. Further structural and operational embodiments will be apparent to persons skilled in the relevant art(s) based on the following discussion regarding flowchart 400 and messaging system 300. Note that in embodiments, the steps of flowchart 400 may be performed in an order that is different than the order shown in FIG. 4, and in some cases, some steps may be performed concurrently.

Flowchart 400 begins with step 402. In step 402, a message is received at a message entity from a publisher. For example, referring to FIG. 3, message sorter 314 of message entity 302 receives a message 322 from publisher 310. Message 322 is an example of message 116 of FIG. 1, and message entity 302 is an example of a message entity of FIG. 1, such as first message entity 110a. In an embodiment, message entity 302 is a queue for messages that are directed to single consumers, such as consumer 312. In such an embodiment, message 322 may be directed to consumer 312 (e.g., may identify consumer 312 as the intended recipient, such as by a consumer address or other identifier). In another embodiment, message entity 302 may be a queue for messages that are directed to a topic that includes consumer 312. In such an embodiment, message 322 may identify a topic by a topic identifier or in other manner.

For instance, one or more subscribers can have registered interests, also referred to as subscriptions, for messages that are published to a topic associated with a message entity. Consumers for a topic are called subscribers. A subscriber can also optionally register rules/filters to determine if a message in a subscription is of interest to the subscriber. Such rules/filters may be used to selectively filter out messages in a topic from being delivered to the subscriber. Otherwise, every message that is published to the topic is delivered to all the matching subscriptions, and therefore a same message can be delivered to multiple consumers. Such a messaging pattern may also be referred to as "pub/sub" ("publish/subscribe").

When received, message sorter 314 may assign a message identifier to message 322. In an embodiment, message identifiers may be sequentially assigned by message sorter 314, so that each received message is assigned a message identifier having a value that is incremented in sequence from an immediately prior received message. Such sequential assigning (or other ordered assigning) may be used to make sure that messages are generally processed in message entity 302 in the order received, subject to whether or not messages are scheduled, and subject to the values of scheduled delivery times.

Referring back to FIG. 4, operation proceeds from step 402 to step 404. In step 404, the message is determined to include a scheduled delivery time. In an embodiment, message sorter 314 is configured to parse message 322 in a similar manner as described above (e.g., step 204 of flowchart 200 in FIG. 2) to determine whether message 322 includes a scheduled delivery time. For instance, message sorter 314 may parse message 322 for a property (e.g., "ScheduledEnqueueTimeUtc") that has a value of a scheduled delivery time, or may determine the scheduled delivery time in another manner from message 322. In this example, message sorter 314 determines that a scheduled delivery time is included in message 116, and operation proceeds to step 406.

In step 406, the received message is stored in a scheduled sub-queue of the message entity. For instance, referring to FIG. 3, message sorter 314 provides message 322 to scheduled sub-queue 316 as scheduled message 324. Scheduled sub-queue 316 is an example of a scheduled sub-queue of FIG. 1, such as scheduled sub-queue 112a. Scheduled sub-queue 112a includes storage for storing scheduled messages, such as scheduled message 324.

Figure 5:
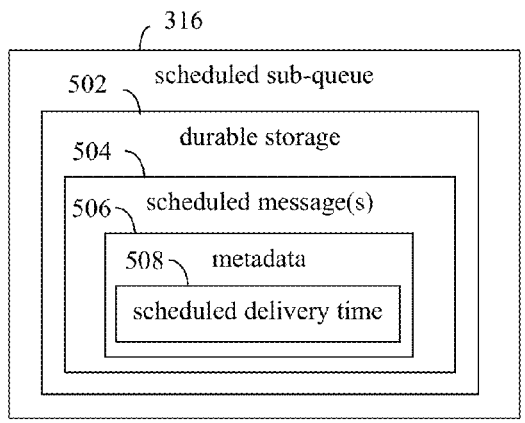
FIG. 5 shows a block diagram of a scheduled sub-queue for storing scheduled messages, according to an example embodiment.

For instance, FIG. 5 shows a block diagram of scheduled sub-queue 316 storing scheduled messages, according to an example embodiment. As shown in FIG. 5, scheduled sub-queue 316 includes durable storage 502. Durable storage 502 is durable storage capable of storing data for long periods of time (e.g., non-volatile storage), and is configured to be resistant to data loss. For instance, durable storage 502 may include one or more of magnetic tapes, hard disks, optical storage, non-volatile memory devices, etc. Note that in an alternative embodiment, non-durable storage may be used instead of durable storage 502.

Furthermore, as shown in FIG. 5, durable storage 502 stores scheduled message(s) 504. Scheduled message(s) 504 includes one or more received scheduled messages, including tens, hundreds, thousands, and even greater numbers of scheduled messages. As shown in FIG. 5, each of scheduled message(s) 504 include metadata 506, which includes scheduled delivery time 508, and potentially includes further metadata, including a message identifier, a message sender identifier, a time of sending, etc. Durable storage 502 may store scheduled message(s) 504 in any manner, including as discrete messages, as message data organized in rows and columns in a messaging database, etc.

Note that as shown in FIG. 3, if message sorter 314 determined that received message 322 did not include a scheduled delivery time, or has a scheduled delivery time that is a past time, message sorter 314 provides message 322 directly to active sub-queue 318 as non-scheduled message 326. In such case, active sub-queue 318 stores non-scheduled message 326 in storage (e.g., durable storage), and scheduled message 326 is ready for delivery to consumer 312 without further delay.

Referring back to FIG. 4, operation proceeds from step 406 to step 408. In step 408, activation metadata is retrieved for any messages stored in the scheduled sub-queue that include a scheduled delivery time within a predetermined upcoming time period. In an embodiment, activation metadata retrieval agent 304 (also referred to as a timer registration agent) is configured to analyze the scheduled delivery times of messages stored in scheduled sub-queue 316 to determine any of the messages that have scheduled delivery times within a predetermined upcoming time period. For instance, scheduled message 324 described above may have a scheduled delivery time in the upcoming time period. For any messages determined to have a scheduled delivery time in the predetermined time period, agent 304 is configured to retrieve metadata of the message from the message. As shown in FIG. 3, the retrieved metadata is indicated as activation metadata 320. Activation metadata 320 includes the retrieved metadata for each message, including scheduled message 324. Activation metadata 320 for each retrieved message may include one or more of a message identifier for the message, a queue identifier for message entity 302, and the scheduled delivery time of the message, and may optionally include further metadata of the message.

For example, in an embodiment, agent 304 may periodically query scheduled sub-queue 316 to analyze the messages stored therein (e.g., analyzing scheduled delivery time 508 in metadata 506 of scheduled message(s) 504 of FIG. 5). Agent 304 may query scheduled sub-queue 316 on a regular basis, at random intervals, or according to any other schedule. Agent 304 may search for messages having scheduled delivery times within any predetermined upcoming time period, such as within the next 300 milliseconds (msec) from a present time, the next 150 msec from the present time, etc. For instance, when scheduled sub-queue 316 stores scheduled messages in a database, agent 304 may search a scheduled delivery time column, field, or other set of entries for the scheduled delivery times of the scheduled messages. Metadata for any such messages is retrieved by agent 304.

Referring back to FIG. 4, operation proceeds from step 408 to step 410. In step 410, the retrieved activation metadata is stored in a memory. For instance, as shown in FIG. 3, activation metadata retrieval agent 304 may store the retrieved metadata in in-memory 308 as activation metadata 320. In-memory 308 is a portion of memory of durable storage 309 that stores activation metadata 320 for about-to-expire messages. Durable storage 309 is durable storage capable of storing data for long periods of time (e.g., non-volatile storage), and is configured to be resistant to data loss. Examples types of durable storage are mentioned elsewhere herein. Durable storage 309 may further store all expired messages and their activation metadata.

Note that in an embodiment, agent 304 may limit the size of activation metadata 320 stored in in-memory 308. For instance, agent 304 may enable a predetermined maximum number of scheduled messages to have metadata stored in in-memory 308 at any particular time. This limiting may preserve space in in-memory 308 for various reasons. For instance, this may avoid committing too much memory space of in-memory 308 when there is a burst of scheduled messages to be activated within a short period of time. Any predetermined maximum number of scheduled messages metadata may be used by agent 304 for limiting purposes, such as metadata for one thousand scheduled messages, metadata for five hundred scheduled messages, or other number.

Figure 6:
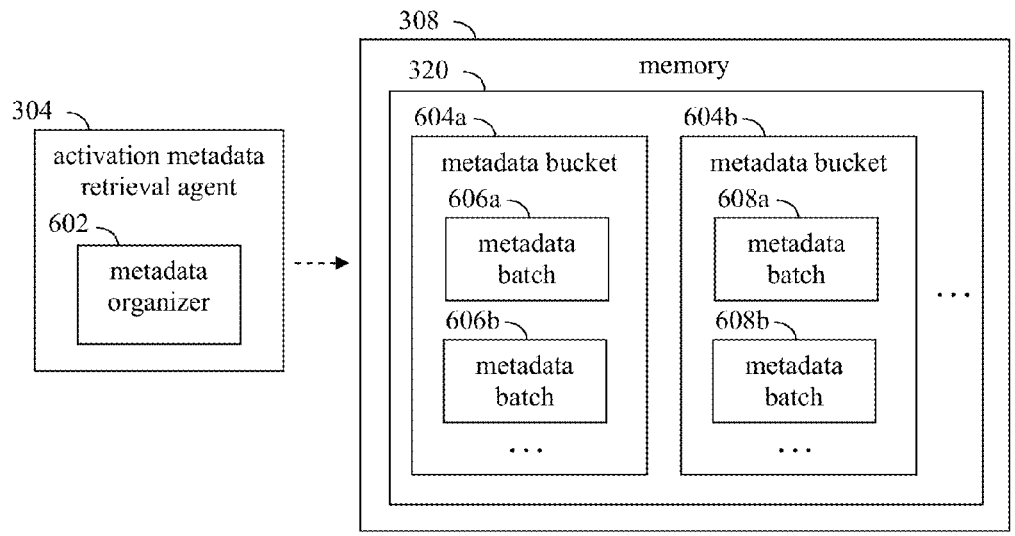
FIG. 6 shows a block diagram of an activation metadata retrieval agent that organizes activation metadata in memory, according to an example embodiment.

Note that agent 304 may be configured to organize activation metadata 320 in in-memory 308 in any manner. For instance, FIG. 6 shows a block diagram of activation metadata retrieval agent 304, according to an example embodiment. As shown in FIG. 6, agent 304 includes a metadata organizer 602. Metadata organizer 602 is configured to organize activation metadata 320 in in-memory 308. In the example of FIG. 6, metadata organizer 602 organizes activation metadata 320 in in-memory 308 in metadata buckets 604a and 604b, and optionally further numbers of metadata buckets 604. Each metadata bucket 604 has an associated time interval (time range), and contains retrieved activation metadata for scheduled messages having a scheduled delivery time within the associated time interval. For example, metadata organizer 602 may configure each metadata bucket to include metadata for messages having scheduled delivery times within a corresponding 150 msec time period, or other time period length. As such, with each metadata bucket covering a corresponding time period, and where in-memory 308 stores a plurality of buckets, in-memory 308 may store activation metadata for messages having scheduled delivery times in an "activation window," such that the messages need to be activated soon (their scheduled delivery times are approaching). An activation window may have any suitable length, such as 15 seconds, 10 seconds, etc., depending on the particular implementation (e.g., based on a messaging system's processing capability, expected load and data access latency, etc.). In an embodiment, the activation window may span a total time period that is that is a sum of the time periods of the metadata buckets. For instance, if each metadata bucket covers a 150 msec time period, and one hundred metadata buckets are stored in in-memory 308, in-memory 308 may be said to have an activation window of 15 seconds (150 msec×100).

Metadata organizer 602 may further organize activation metadata 320 at an even more granular level. For instance, as shown in FIG. 3, metadata organizer 602 may organize the activation metadata in each metadata bucket 604 into a plurality of batches. As shown in FIG. 3, metadata bucket 604a includes metadata batches 606a and 606b, and optionally further numbers of metadata batches 606, and metadata bucket 604b includes metadata batches 608a and 608b, and optionally further numbers of metadata batches 608. In an embodiment, each batch includes activation metadata for messages that can be activated together (e.g., having a common scheduled delivery time, having scheduled delivery times that are very close together, such as within a few seconds of each other, and/or originating from a same message entity/queue). Thus, each metadata batch may include metadata for one or more messages covering a predetermined time period of scheduled delivery times that is a subset of the time period of the metadata bucket in which the metadata batch is included, referred to as the "batch interval."

Referring back to FIG. 4, operation proceeds from step 410 to step 412. In step 412, the stored retrieved activation metadata is analyzed to determine a batch of messages in the scheduled sub-queue ready for delivery. For example, referring to FIG. 3, activation agent 306 may be configured to analyze activation metadata 320 to determine one or more messages in scheduled sub-queue 316 that is/are ready for delivery to consumers.

In an embodiment, activation agent 306 is responsible for scheduling and creating activation tasks that run asynchronously to fulfill the actual activation. Activation agent 306 ensures the activation tasks are run no sooner than the specified activation time (scheduled delivery time of the corresponding messages). In addition, activation agent 306 performs throttling by capping the maximum number of concurrent activation tasks. The throttling may be used to prevent activation from using all available system resources or too much of the available system resources. Different throttling strategies can be implemented based on characteristics of each messaging system implementation. For instance, in one implementation, data connections to durable storage may be throttled.

Activation agent 306 may be limited to run when there is a scheduled message to be activated. A minimum wait interval (e.g., 100 msec, etc.) may be waited by activation agent 306 between runs. For instance, the minimum wait interval may be the same as the batch interval described above for the batches of activation metadata stored in in-memory 308 (which may be a portion of the predetermined upcoming time period used by activation metadata retrieval agent 304). For instance, where the batch interval is 100 msec, messages having scheduled delivery times in the same 100 msec time period may be activated in a single batch. Operating in batch mode enables improved resource utilization with little sacrifice on activation latency. Each messaging system implementation may configure its own batching strategy, in embodiments.

In one example implementation, messages may be batched by a message entity (e.g., single-consumer queue or topic with multiple subscribers). With the batching strategy in mind, an example data structure that may be used by activation agent 306 is shown as the below activation list. Six message batches are shown below:

T1
Message entity 110a Message#1, Message#2, Message#3 . . . .
Message entity 110b Message#4, Message#5, Message#6 . . . .
T1+100 msec
Message entity 110a Message#11, Message#12, Message#13 . . . .
Message entity 110b Message#11, Message#12, Message#13 . . . .
T1+200 msec
Message entity 110a Message#21, Message#22, Message#23 . . . .
Message entity 110b Message#31, Message#32, Message#33 . . . .

In this example, in-memory 308 includes activation metadata for scheduled messages of two message entities—message entities 110a and 110b of FIG. 1. As such, activation agent 306 is configured to periodically analyze activation metadata 320 in in-memory 308 for scheduled messages of both of message entities 110a and 110b that are ready for delivery. As shown below, agent 306 may determine that messages of message entity 110a with message identifiers of Message#1, Message#2, and Message#3, and messages of message entity 110b with message identifiers of Message#4, Message#5, Message#6 are ready for delivery during a current time period T1. Furthermore, agent 306 may determine that further messages of message entities 110a and 110b (with message identifiers shown above) are ready for delivery during a subsequent time period T1+100 msec, and still further messages of message entities 110a and 110b (with message identifiers shown above) are ready for delivery during a subsequent time period T1+200 msec. Activation metadata for each of these time period/message entities combinations may have been stored in batches in in-memory 308, as described above. As such, activation agent 306 may activate batches of messages corresponding to the batches of activation metadata.

In an embodiment, activation agent 306 may be configured to track the scheduled time for the next scheduled message across all messaging entities. For instance, when activation agent 306 is analyzing a batch of activation metadata to activate a current batch of scheduled messages, activation agent 306 may analyze a next batch of activation metadata to determine a last scheduled delivery time of the corresponding next batch of scheduled messages. This determined scheduled delivery time may be used to determine when activation agent 306 is to be scheduled to run a next activation.

Thus, in an embodiment, activation agent 306 may be configured to analyze activation metadata 320 on a periodic or other basis for messages ready for delivery. For example, activation agent 306 may be configured to "wake up" every 100 msec (or other time period), or after a longer time if there are no immediate message activations pending. When, activation agent 306 wakes, activation agent 306 may retrieve activation metadata 332 from in-memory 308. Activation metadata 332 may include one or more batches of activation metadata 320 that include scheduled delivery times indicating messages that are ready for delivery (e.g., have a scheduled delivery time that has arrived or has passed).

Referring back to FIG. 4, operation proceeds from step 412 to step 414. In step 414, the determined batch of messages is stored in an active sub-queue of the message entity. For example, as shown in FIG. 3, activation agent 306 may perform an activation task by retrieving scheduled messages 330 from scheduled sub-queue 316. Scheduled messages 330 include scheduled messages identified in activation metadata 332 as ready for delivery, such as scheduled message 324 described above. For instance, activation agent 306 may use message identifiers included in activation metadata 332 to identify messages stored in scheduled sub-queue 316 for retrieval. As shown in FIG. 3, activation agent 306 may store scheduled messages 330 in active sub-queue 318 as scheduled messages 334. In the current example, scheduled messages 334 includes scheduled message 324.

In an embodiment, an activation task performed by activation agent 306 may include a read of a scheduled message with a specified sequence number (e.g., message identifier, when in sequence) out of scheduled sub-queue 316, and a write of the scheduled message to active sub-queue 318. Furthermore, the activation task may include activation agent 306 completing the scheduled message in scheduled sub-queue 316. As part of a "complete" operation, the activation metadata of the scheduled message may be purged from the durable storage of scheduled sub-queue 316.

Furthermore, during the "complete" operation, the activation metadata of the scheduled message may be updated in in-memory 308. The status of the activation metadata for the scheduled message may be updated from "Pending" to "Completed" in in-memory 308 Eventually, activation metadata retrieval agent 304 may update a record of the activation metadata for the scheduled message in in-memory 308 when activation metadata retrieval agent 304 next retrieves activation metadata from scheduled sub-queue 316 to be stored in in-memory 308. This helps avoid a race condition between updating activation metadata in in-memory 308 versus activation metadata retrieved by activation metadata retrieval agent 304, where activation metadata retrieval agent 304 may return before activation is completed and causes duplicate activation. If activation metadata retrieval agent 304 attempts to again add activation metadata for a same scheduled message in in-memory 308, it will be idempotent, because the entry already exists. Furthermore, because the activation metadata is marked as "completed", the scheduled message will not be activated again.

Note that in an embodiment, activation agent 304 may activate scheduled messages for message entity 302 "in order." In such an embodiment, scheduled messages are delivered from message entity 302 to consumers in the same order that they are published to message entity 302 by publishers (subject to the various scheduled delivery times). For instance, in an embodiment, (a) scheduled messages are activated in order within a same message entity, and (b) scheduled messages that have a scheduled delivery time that is later than the enqueue time of a non-scheduled message are delivered after the non-scheduled message.

To achieve in order delivery, activations of scheduled messages may be batched as described above. Activation batches can be performed in parallel across different message entities, but in an embodiment, at any particular time, a single batch of messages per message entity may be activated. The scheduled messages within the batch may be ordered by their scheduled delivery times, with message sequence numbers (e.g., message identifiers) being used to break a tie on same scheduled delivery times.

If activating a batch fails, such as due to transient network or database errors, the batch may be maintained in the in-memory collection of activation metadata 320 in in-memory 308 for a next activation task to retry. In an embodiment, "wait and retry" may be implemented, such as by moving the metadata into a next time bucket. But no scheduled messages having a later scheduled delivery time should be activated before the previous batch of scheduled messages is processed.

As such, in embodiments, scheduled messages may be stored in a scheduled sub-queue until their scheduled delivery time is near. Activation metadata may be extracted from the scheduled messages, and may be used to transfer the scheduled messages to an active sub-queue for delivery on or after their scheduled delivery times. Usage of the activation metadata conserves memory space. The following subsection describes example embodiments for delivering scheduled messages from the active sub-queue.

B. Example Embodiments for Delivering Scheduled Messages

As described above, in an embodiment, scheduled messages may be loaded into the active sub-queue for delivery based on activation metadata. Such scheduled messages may include messages directed to a single-consumer or messages directed to multiple consumers. The scheduled messages (along with any non-scheduled messages) may be delivered from the active-sub queue to consumers in any manner, including in response to a request from the consumer.

Figure 7:
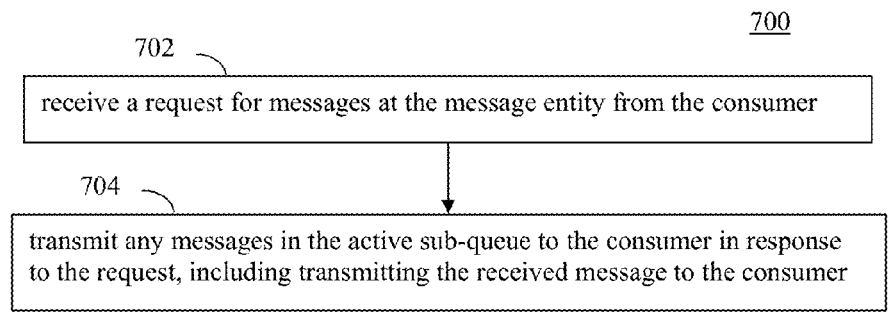
FIG. 7 shows a flowchart providing a process for handling messages directed to a single consumer, according to an example embodiment.
Figure 8:
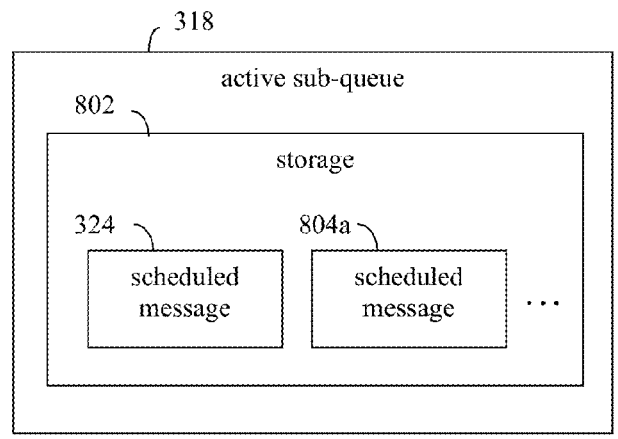
FIG. 8 shows a block diagram of an active sub-queue that stores messages, according to an example embodiment.

Such embodiments may be implemented in various ways. For instance, FIG. 7 shows a flowchart 700 providing a process for handling messages directed to a single consumer, according to an example embodiment. In an embodiment, flowchart 700 may be implemented by active sub-queue 318 of FIG. 3. FIG. 8 shows a block diagram of active sub-queue 318 of FIG. 3, according to an example embodiment. Flowchart 700 is described as follows with reference to FIGS. 3 and 8 for purposes of illustration. Further structural and operational embodiments will be apparent to persons skilled in the relevant art(s) based on the following discussion.

Flowchart 700 begins with step 702. In step 702, a request for messages is received at the message entity from the consumer. For instance, as shown in FIG. 3, active sub-queue 318 receives a request 336 from consumer 312. In the current example being described with respect to flowchart 700, message entity 302 handles messages directed to a single consumer—consumer 312. Request 336 is a request, similar to request 118 described above with respect to FIG. 1, for any messages that are stored in active sub-queue 318 to be delivered to consumer 312.

In step 704, any messages in the active sub-queue are transmitted to the consumer in response to the request, including transmitting the received message to the consumer. In an embodiment, in response to request 336, active sub-queue 318 may transfer each of the messages stored therein to consumer 312, including scheduled message 324.

For instance, as shown in FIG. 8, active sub-queue 318 may include storage 802. In an embodiment, storage 802 may be durable storage similar to durable storage 502 of FIG. 5, or may be non-durable storage. For instance, storage 802 may include one or more of magnetic tapes, hard disks, optical storage, non-volatile memory devices, etc. As shown in FIG. 8, storage 802 stores scheduled messages that are ready for delivery to a consumer, such as consumer 312 of FIG. 3. In the example of FIG. 8, storage 802 stores scheduled message 324, scheduled message 804a, and optionally further scheduled messages, which are "active" scheduled messages. Furthermore, storage 802 may store non-scheduled messages (not shown in FIG. 8) that are also directed to the consumer. Storage 802 of active sub-queue 318 may store any number of messages that are ready for delivery, including tens, hundreds, thousands, and even greater numbers of scheduled messages. Storage 802 may store messages in any manner, including as discrete messages, as message data organized in a messaging database, etc. Storage 802 may store messages in order of their message identifiers, to enable in order message delivery.

Thus, in embodiments, active sub-queue 318 may store and handle the delivery of messages directed to a single consumer. In another embodiment, active sub-queue 318 may store and handle the delivery of messages directed to a topic to which a group of consumers subscribe ("subscribers"). Such embodiments may be implemented in various ways.

Figure 9:
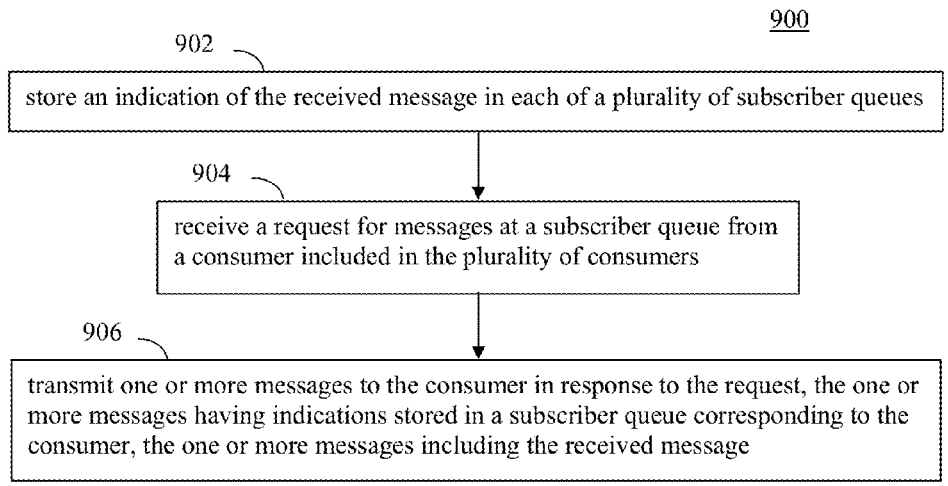
FIG. 9 shows a flowchart providing a process for handling messages directed to a topic, according to an example embodiment.
Figure 10:
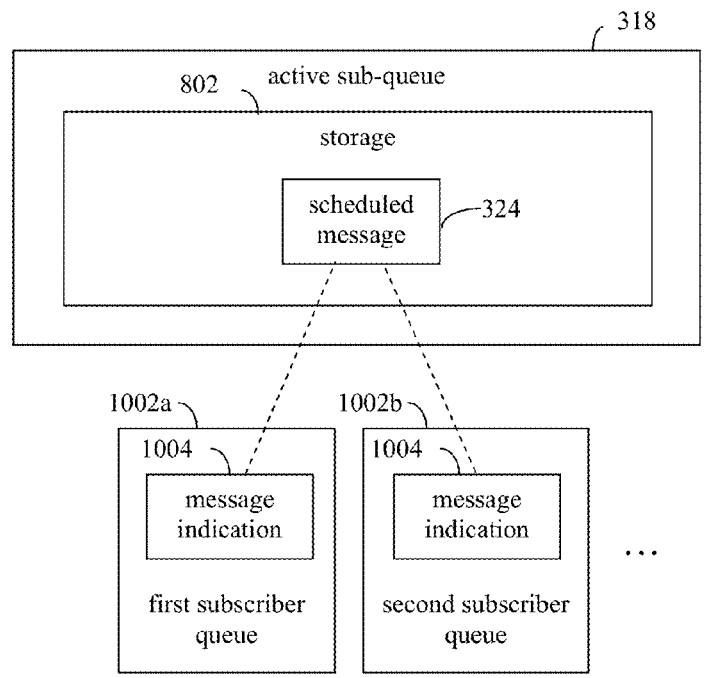
FIG. 10 shows a block diagram of an active sub-queue associated with a plurality of subscriber queues for storing messages directed to a topic, according to an example embodiment.

For instance, FIG. 9 shows a flowchart 900 providing a process for handling messages directed to a topic, according to an example embodiment. In an embodiment, flowchart 900 may be implemented by active sub-queue 318 of FIG. 3. FIG. 10 shows a block diagram of active sub-queue 318 of FIG. 3 associated with a plurality of subscriber queues for storing messages for a topic, according to an example embodiment. Flowchart 900 is described as follows with reference to FIGS. 3 and 10 for purposes of illustration. Further structural and operational embodiments will be apparent to persons skilled in the relevant art(s) based on the following discussion.

Flowchart 900 begins with step 902. In step 902, an indication of the received message is stored in each of a plurality of subscriber queues. In an embodiment, a message entity, such as message entity 302 of FIG. 3 may handle messages directed to a topic to which a plurality of consumers (e.g., first consumer 106a, second consumer 106b, etc., as shown in FIG. 1) subscribes. As shown in FIG. 10, active sub-queue 318 may be associated with a plurality of subscriber queues 1002a, 1002b, and optionally further subscriber queues 1002. The plurality of subscriber queues corresponds to the plurality of consumers that are subscribers to messages from publishers directed to the topic. Each subscriber queue is used to contain messages for a corresponding consumer of subscriber group subscribing to messages of the topic. As such, a scheduled message directed to the topic may be stored in active sub-queue 318 by activation agent 306 (as described above in step 414 of flowchart 400). Furthermore, messaging entity 302 may provide an indication of the scheduled message to each of subscriber queues 1002a, 1002b, etc., to be accessible by the consumers. For instance, messaging entity 302 may store an actual copy of the scheduled message in each of subscriber queues 1002a, 1002b, etc. Alternatively, messaging entity 302 may store an indication of the scheduled message in each of subscriber queues 1002a, 1002b, etc.

For example, scheduled message 324 may be determined by activation agent 306 to be ready for delivery, and activation agent 306 may store scheduled message 324 in active sub-queue 318 (e.g., in storage 802). Furthermore, as shown in FIG. 10, rather than storing a separate copy of scheduled message 324 in each of subscriber queues 1002a, 1002b, etc., message entity 302 may provide a message indication 1004 that is representative of scheduled message 324 to be stored in each of subscriber queues 1002a, 1002b, etc. Message indication 1004 may be a message identifier for scheduled message 324, a link or pointer to scheduled message 324 in storage 802, or other reference to scheduled message 324. By storing message indication 1004 in each subscriber queue rather than storing scheduled message 324 in each subscriber queue in its entirety, storage space may be conserved. It is noted that message entity 302 does not provide scheduled message 324 to any subscriber queues associated with active sub-queue 318 that correspond to a consumer that does not subscribe to the particular topic to which scheduled message 324 is directed.

In one embodiment, subscriber queues 1002a, 1002b, etc., may be stored locally to active sub-queue 318, such as being stored in storage 802 or in storage associated with one or more computing devices that contain the messaging system that includes active sub-queue 318. In another embodiment, one or more of subscriber queues 1002a, 1002b, etc., may be remote from active sub-queue 318, such as being managed by one or more computing devices that are not associated with the messaging system that includes active sub-queue 318.

Referring back to FIG. 9, operation proceeds from step 902 to step 904. In step 904, a request for messages is received at a subscriber queue from a consumer included in the plurality of consumers. For instance, in one embodiment, active sub-queue 318 receives a request 336 from consumer 312. In another example, request 336 is received from consumer 312 directly at the corresponding subscriber queue. Request 336 is a request, similar to request 118 described above with respect to FIG. 1, for any messages that are stored in the subscriber queue corresponding to consumer 312 to be delivered to consumer 312. For instance, in the current example, first subscriber queue 1002a may correspond to consumer 312 (e.g., an identifier for consumer 312 may be associated with first subscriber queue 1002a). As such, request 336, which may include an identifier for consumer 312, is a request for any messages stored in first subscriber queue 1002a to be delivered to consumer 312.

In step 906, one or more messages are transmitted to the consumer in response to the request, the one or more messages having indications stored in a subscriber queue corresponding to the consumer, the one or more messages including the received message. In an embodiment, in response to request 336, first subscriber queue 1002a may transmit each of the messages indicated therein to consumer 312. For instance, as shown in FIG. 10, message indication 1004 in first subscriber queue 1002a refers to scheduled message 324. As such, in response to request 336, first subscriber queue 1002a may transmit scheduled message 324 to consumer 312. Furthermore, first subscriber queue 1002a may transmit any further scheduled messages indicated therein to consumer 312.

Note that the embodiment of FIG. 10 is provided for purposes of illustration, and is not intended to be limiting. In alternative embodiments, alternative techniques for storing active messages may be used (e.g., that do not implement subscriber queues).

C. Example Embodiments for Handling Short Schedule Time Messages

As described above, in embodiments, scheduled messages with short schedule times that are received by a messaging system may be handled in an expedited manner to reduce activation latency. For instance, in an embodiment, when a scheduled message with a short scheduled time span is received by a messaging system, the activation metadata of the scheduled message may be stored in memory immediately. A criterion for a "short scheduled time span" is the length of the activation window (the maximum range of scheduled delivery times in activation metadata from the current time that may be stored in in-memory 308 at any particular time). If the scheduled delivery time is within the activation window, then the activation metadata of the scheduled message may be inserted into the in-memory activation metadata 320, during a same transaction used to durably store the scheduled message in scheduled sub-queue 316. This eliminates the need to wait for the next metadata retrieval task by activation metadata retrieval agent 304 to retrieve the activation metadata from the durable store of scheduled sub-queue 316, and hence, reduces the activation latency for scheduled messages with short timers.

Figure 11:
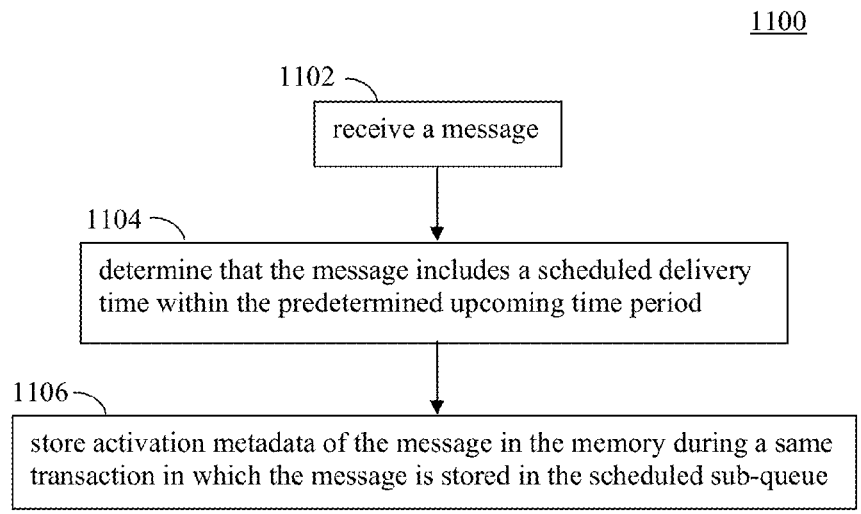
FIG. 11 shows a flowchart providing a process for processing short schedule time messages, according to an example embodiment.
Figure 12:
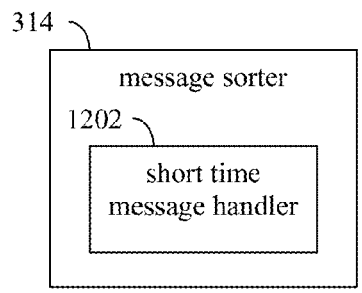
FIG. 12 shows a block diagram of a message sorter configured to handle short schedule time messages, according to an example embodiment.

Such embodiments may be implemented in various ways. For instance, FIG. 11 shows a flowchart providing a process for processing short schedule time messages, according to an example embodiment. In an embodiment, flowchart 1100 may be implemented by message sorter 314 of FIG. 3. For instance, FIG. 12 shows a block diagram of message sorter 314 configured to handle short schedule time messages, according to an example embodiment. As shown in FIG. 12, message sorter 314 includes a short time message handler 1202. Flowchart 1100 is described as follows with reference to FIGS. 3 and 10 for purposes of illustration. Further structural and operational embodiments will be apparent to persons skilled in the relevant art(s) based on the following discussion.

Flowchart 1100 begins with step 1102. In step 1102, a message is received. For example, referring to FIG. 3, message 322 may be received. Operation proceeds to step 1104.

In step 1104, the message is determined to include a scheduled delivery time within the predetermined upcoming time period. For instance, as described above, message sorter 314 may parse message 322 to determine whether message 322 includes a scheduled delivery time. Furthermore, in an embodiment, if a scheduled delivery time is determined to be included, short time message handler 1202 may compare the scheduled delivery time to a current time. If the scheduled delivery time is within the activation window (e.g., is before the end of the activation window, such as being within 15 seconds of the current time), short time message handler 1202 may process message 322 as a short delivery time message (e.g., a "short timer"). Operation proceeds to step 1106.

In step 1106, activation metadata of the message is stored in the memory during a same transaction in which the message is stored in the scheduled sub-queue. When message 322 is determined to be a short delivery time message, activation metadata may be extracted from message 322 by short time message handler 1202 (e.g., the scheduled delivery time, the message identifier, the message entity identifier, etc.), and stored in in-memory 308. Furthermore, message sorter 314 may store message 322 in scheduled sub-queue 316 as message 324. In an embodiment, a same transaction (e.g., a same software operation) may be used to store the activation metadata in in-memory 308 and store message 322 in scheduled sub-queue 316.

D. Further Example Embodiments for a Messaging System

Figure 13:
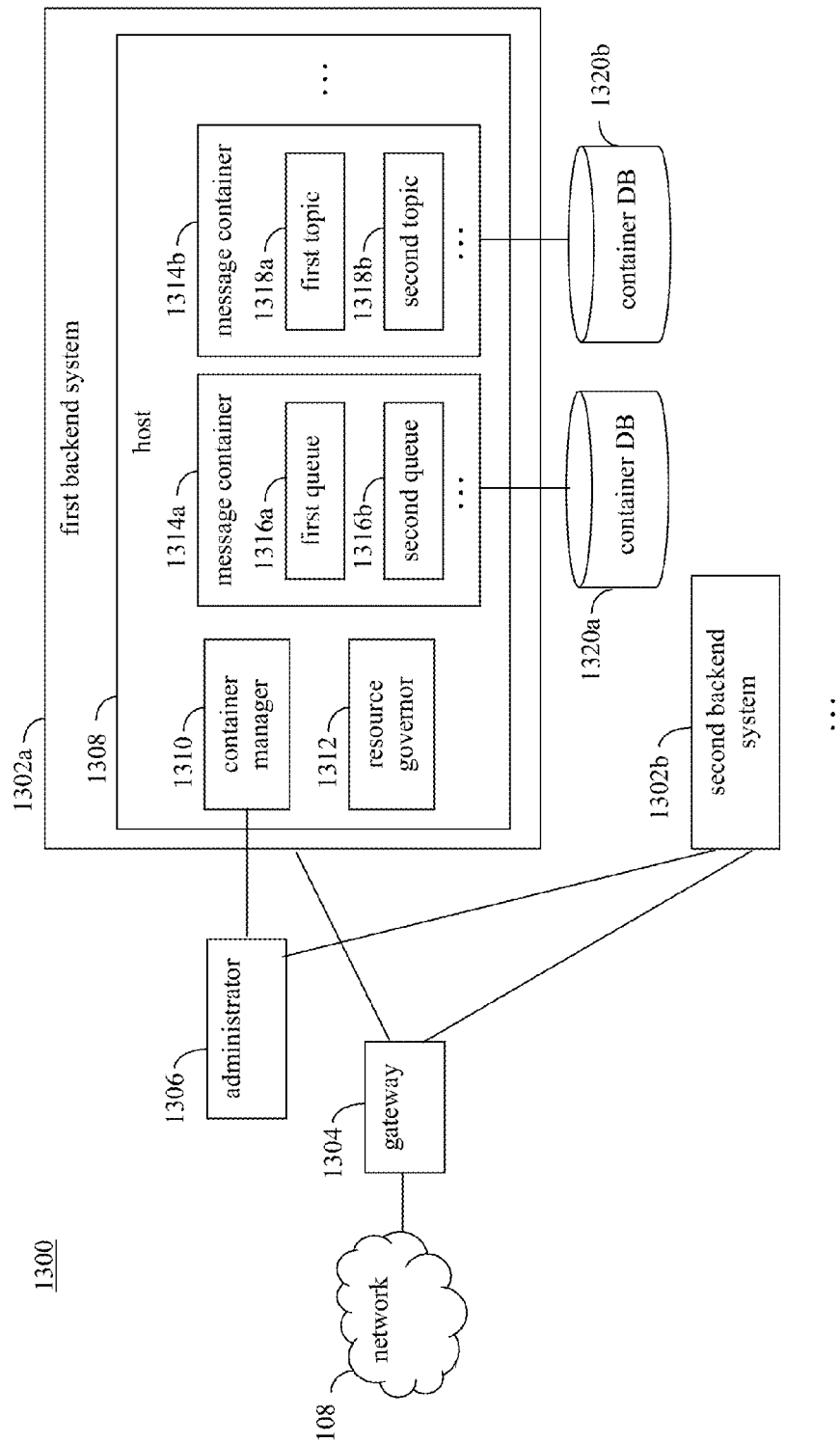
FIG. 13 shows a block diagram of an example messaging system, according to an embodiment.

In embodiments, messaging system 104 of FIG. 1 (and messaging system 300 of FIG. 3) may be configured in various ways. For instance, FIG. 13 shows a block diagram of an example messaging system 1300, according to an embodiment. As shown in FIG. 13, messaging system 1300 includes first and second backend systems 1302a and 1302b, a gateway 1304, an administrator 1306, and first and second container databases (DB) 1320a and 1320b. Messaging system 1300 is provided for illustrative purposes and is not intended to be limiting, as messaging systems may be configured in other ways, in embodiments. Messaging system 1300 is described as follows.

As shown in FIG. 13, gateway 1304 is coupled to network 108. Gateway 1304 interfaces messaging system 1300 with network 108, and may perform various functions such as security (e.g., authentication and validation of messages, etc.), load balancing, etc. Messages, such as message 116 shown in FIG. 1, may be received from publishers by messaging system 1300 at gateway 1304 through network 108. Gateway 1304 may direct a received message to a corresponding backend system of messaging system 1300. Furthermore, requests for messages, such as request 118 shown in FIG. 1, may be received from consumers by messaging system 1300 at gateway 1304 through network 108, and messages, such as message 120 of FIG. 1, may be transmitted to the consumers from messaging system 1300 in response to the requests. The messages may be transmitted to the consumers through or around gateway 1304 by backend systems of messaging system 1300, such as first and second backend systems 1302a and 1302b.

First and second backend systems 1302a and 1302b are each implemented in one or more computing devices (e.g., servers, etc.). First and second backend systems 1302a and 1302b each include respective message queues that handle the delivery of scheduled and non-scheduled messages, as described herein. For instance, as shown in FIG. 13, first backend system 1302a may include a host 1308. Host 1308 is configured to host one or more message queues. Host 1308 may also be referred to as a message entity host or a messaging host. In an embodiment, host 1308 executes the message entities that are present. In an embodiment, host 1308 may be implemented as one or more processes running in first backend system 1302a.

Furthermore, as shown in FIG. 13, host 1308 includes a container manager 1310, a resource governor 1312, a first message container 1314a, a second message container 1314b, and optionally further message containers 1314. Any number of message containers 1314 may be included in host 1308, and one or more message containers 1314 may reside on a particular storage partition. Message containers 1314 each include one or more message queues and/or topics. As shown in FIG. 13, message container 1314a includes first queue 1316a, second queue 1316b, and optionally further queues 1316. Furthermore, message container 1314b includes first topic 1318a, second topic 1318b, and optionally further topics 1318. Queues 1316a and 1316b and topics 1318a and 1318b are examples of message entities 110a and 110b of FIG. 1 and message entity 302 of FIG. 3. Queues 1316a and 1316b handle messages directed to a single consumer, and topics 1318a and 1318b handle messages direct to a topic (having a group of subscribers), as further described above. Queues 1316a and 1316b and topics 1318a and 1318b may each handle scheduled and non-scheduled messages for a corresponding consumer set, as described herein. Any number of queues and/or topics may be present in a message container 1314, including tens, hundreds, thousands, and even greater numbers of queues and/or topics. The run time of a message container may be referred to as a "message broker."

Each message container 1314 is coupled to a corresponding container database 1320. For instance, message container 1314a is coupled to container database 1320a, and message container 1314b is coupled to container database 1320b. Container databases 1320a and 1320b are databases (also referred to as data stores) that store messages of the queues of message containers 1314a and 1314b, respectively. For instance, the messages stored in scheduled sub-queues and active sub-queues of a message entity may be stored in a container database 1320. In an embodiment, container databases 1320a and 1320b may contain durable storage that is used to durably store the messages.

Container manager 1310 may be present to monitor message containers 1314. For instance, container manager 1310 may generate reports on how many queues and/or topics are present in backend system 1302a, and how much storage space is being used. Resource governor 1312 may be present to monitor resource usage (e.g., memory space, number of processes running, etc.) by backend system 1302a, and may throttle resource usage when too many resources are being used.

Administrator 1306 is configured to administer backend systems 1302a and 1302b, and any further backend systems 1302 that are present. For instance, administrator 1306 may perform provisioning management to activate additional backend systems (or deactivate backend systems) when needed for changes in load. Furthermore, administrator 1306 may perform upgrade management to upgrade backend systems (e.g., software) when upgrades are available.

Although two backend systems 1302a and 1302b are shown in FIG. 13, any number of backend systems 1302 may be present, including tens, hundreds, thousands, and even greater numbers of backend systems 1302. Furthermore, although not shown in FIG. 13 for ease of illustration, second backend system 1302b (and further backend systems) may be implemented similarly to first backend system 1302a, including a corresponding host 1308, container manager 1310, resource governor 1312, and one or more message containers 1314 that each contain one or more queues and/or topics.

III Example Computing Device Embodiments

First and second message entities 110a and 110b, scheduled sub-queues 112a and 112b, active sub-queues 114a and 114b, message entity 302, activation metadata retrieval agent 304, activation agent 306, message sorter 314, scheduled sub-queue 316, active sub-queue 318, metadata organizer 602, subscriber queues 1002a and 1002b, short time message handler 1202, gateway 1304, administrator 1306, host 1308, container manager 1310, resource governor 1312, message containers 1314a and 1314b, first and second queues 1316a and 1316b, first and second topics 1318a and 1318b, flowchart 200, flowchart 400, flowchart 700, flowchart 900, and flowchart 1100 may be implemented in hardware, software, firmware, or any combination thereof.

For example, first and second message entities 110a and 110b, scheduled sub-queues 112a and 112b, active sub-queues 114a and 114b, message entity 302, activation metadata retrieval agent 304, activation agent 306, message sorter 314, scheduled sub-queue 316, active sub-queue 318, metadata organizer 602, subscriber queues 1002a and 1002b, short time message handler 1202, gateway 1304, administrator 1306, host 1308, container manager 1310, resource governor 1312, message containers 1314a and 1314b, first and second queues 1316a and 1316b, first and second topics 1318a and 1318b, flowchart 200, flowchart 400, flowchart 700, flowchart 900, and/or flowchart 1100 may be implemented as computer program code configured to be executed in one or more processors. Alternatively, first and second message entities 110a and 110b, scheduled sub-queues 112a and 112b, active sub-queues 114a and 114b, message entity 302, activation metadata retrieval agent 304, activation agent 306, message sorter 314, scheduled sub-queue 316, active sub-queue 318, metadata organizer 602, subscriber queues 1002a and 1002b, short time message handler 1202, gateway 1304, administrator 1306, host 1308, container manager 1310, resource governor 1312, message containers 1314a and 1314b, first and second queues 1316a and 1316b, first and second topics 1318a and 1318b, flowchart 200, flowchart 400, flowchart 700, flowchart 900, and/or flowchart 1100 may be implemented as hardware logic/electrical circuitry.

For instance, in an embodiment, one or more of first and second message entities 110a and 110b, scheduled sub-queues 112a and 112b, active sub-queues 114a and 114b, message entity 302, activation metadata retrieval agent 304, activation agent 306, message sorter 314, scheduled sub-queue 316, active sub-queue 318, metadata organizer 602, subscriber queues 1002a and 1002b, short time message handler 1202, gateway 1304, administrator 1306, host 1308, container manager 1310, resource governor 1312, message containers 1314a and 1314b, first and second queues 1316a and 1316b, first and second topics 1318a and 1318b, flowchart 200, flowchart 400, flowchart 700, flowchart 900, and/or flowchart 1100 may be implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 14:
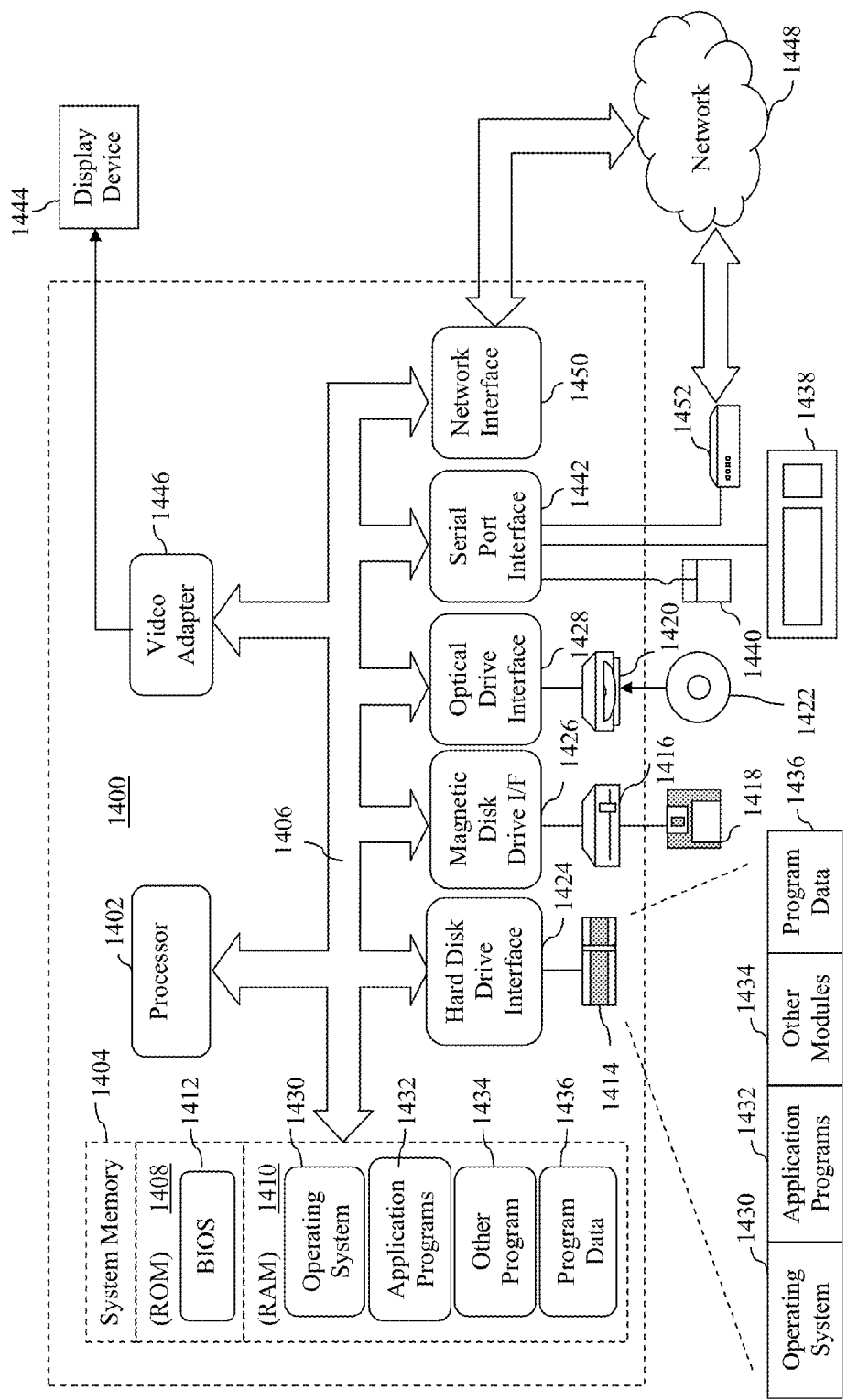
FIG. 14 shows a block diagram of an example computer that may be used to implement embodiments of the present invention.

FIG. 14 depicts an exemplary implementation of a computer 1400 in which embodiments of the present invention may be implemented. For example, first publisher 102a, second publisher 102b, messaging system 104, first consumer 106a, second consumer 106b, messaging system 300, consumer 312, publisher 310, client 340, first backend system 1302a, second backend system 1302b, gateway 1304, and administrator 1306 may each be implemented in one or more computer systems similar to computer 1400, including one or more features of computer 1400 and/or alternative features. Computer 1400 may be a general-purpose computing device in the form of a conventional personal computer, a mobile computer, a server, or a workstation, for example, or computer 1400 may be a special purpose computing device. The description of computer 1400 provided herein is provided for purposes of illustration, and is not intended to be limiting. Embodiments of the present invention may be implemented in further types of computer systems, as would be known to persons skilled in the relevant art(s).

As shown in FIG. 14, computer 1400 includes one or more processors 1402, a system memory 1404, and a bus 1406 that couples various system components including system memory 1404 to processor 1402. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computer 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1430, one or more application programs 1432, other program modules 1434, and program data 1436. Application programs 1432 or program modules 1434 may include, for example, computer program logic (e.g., computer program code or instructions) for implementing first and second message entities 110a and 110b, scheduled sub-queues 112a and 112b, active sub-queues 114a and 114b, message entity 302, activation metadata retrieval agent 304, activation agent 306, message sorter 314, scheduled sub-queue 316, active sub-queue 318, metadata organizer 602, subscriber queues 1002a and 1002b, short time message handler 1202, gateway 1304, administrator 1306, host 1308, container manager 1310, resource governor 1312, message containers 1314a and 1314b, first and second queues 1316a and 1316b, first and second topics 1318a and 1318b, flowchart 200, flowchart 400, flowchart 700, flowchart 900, and/or flowchart 1100 (including any step of flowcharts 200, 400, 700, 900, and 1100), and/or further embodiments described herein.

A user may enter commands and information into the computer 1400 through input devices such as keyboard 1438 and pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor 1402 through a serial port interface 1442 that is coupled to bus 1406, but may be connected by other interfaces, such as a parallel port, game port, or a universal serial bus (USB).

A display device 1444 is also connected to bus 1406 via an interface, such as a video adapter 1446. In addition to the monitor, computer 1400 may include other peripheral output devices (not shown) such as speakers and printers.

Computer 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

As used herein, the terms "computer program medium," "computer-readable medium," and "computer-readable storage medium" are used to generally refer to media such as the hard disk associated with hard disk drive 1414, removable magnetic disk 1418, removable optical disk 1422, as well as other media such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1432 and other program modules 1434) may be stored on the hard disk, magnetic disk, optical disk, ROM, or RAM. Such computer programs may also be received via network interface 1450, serial port interface 1442, or any other interface type. Such computer programs, when executed or loaded by an application, enable computer 1400 to implement features of embodiments of the present invention discussed herein. Accordingly, such computer programs represent controllers of the computer 1400.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method in a messaging system, comprising:
   receiving a message at a message entity from a publisher that is directed to at least one consumer;
   determining that the message includes a scheduled delivery time;
   storing the received message in a scheduled sub-queue of the message entity;
   retrieving activation metadata for any messages stored in the scheduled sub-queue that include a scheduled delivery time within a predetermined upcoming time period, the retrieved activation metadata including metadata retrieved for the received message, the metadata for the received message being less than an entirety of the received message;
   storing the retrieved activation metadata in a memory;
   analyzing the stored retrieved activation metadata to determine a batch of messages in the scheduled sub-queue ready for delivery, the batch of messages including the received message; and
   storing the determined batch of messages in an active sub-queue of the message entity.

2. The method of claim 1, wherein the received message is directed to a single consumer associated with the message entity, the method further comprising:
   receiving a request for messages at the message entity from the consumer; and
   transmitting any messages in the active sub-queue to the consumer in response to the request, including transmitting the received message to the consumer.

3. The method of claim 1, wherein the received message is directed to a topic, the method further comprising:
   storing an indication of the received message in each of a plurality of subscriber queues, the plurality of subscriber queues corresponding to a plurality of consumers that subscribe to the topic.

4. The method of claim 3, further comprising:
   receiving a request for messages at the message entity from a consumer included in the plurality of consumers; and
   transmitting one or more messages to the consumer in response to the request, the one or more messages having indications stored in a subscriber queue corresponding to the consumer, the one or more messages including the received message.

5. The method of claim 1, further comprising:
   receiving a second message;
   determining that the second message does not include a scheduled delivery time; and
   storing the received second message in the active sub-queue without first storing the received second message in the scheduled sub-queue.

6. The method of claim 1, wherein said storing the retrieved activation metadata in a memory comprises:
   organizing the retrieved activation metadata in a plurality of buckets, each bucket of the plurality of buckets having an associated time interval and containing retrieved activation metadata for messages having a scheduled delivery time within the associated time interval.

7. The method of claim 6, wherein said storing the retrieved activation metadata in a memory further comprises:
   organizing the retrieved activation metadata in a first bucket of the plurality of buckets into a plurality of batches, each batch of the plurality of batches including messages belonging to a same message entity.

8. The method of claim 1, wherein said storing the received message in a scheduled sub-queue of the message entity comprises:
   durably storing the received message in the scheduled sub-queue.

9. The method of claim 1, wherein the metadata retrieved for the received message includes a message identifier for the received message, a queue identifier for the message entity, and the scheduled delivery time of the received message.

10. The method of claim 1, further comprising:
    receiving a second message;

determining that the second message includes a scheduled delivery time within the predetermined upcoming time period;
extracting activation metadata from the second message; and
storing the extracted activation metadata of the second message in the memory as soon as the second message is stored in the scheduled sub-queue.

11. A messaging system, comprising:
a first message entity that includes a message sorter, a scheduled sub-queue, and an active sub-queue, the message sorter stores received messages that include a scheduled delivery time in the scheduled sub-queue, and stores received messages that do not include a scheduled delivery time in the active sub-queue, the scheduled sub-queue including durable storage that stores received messages for the scheduled sub-queue;
a memory;
an activation metadata retrieval agent that retrieves activation metadata for any messages stored in the scheduled sub-queue that include a scheduled delivery time within a first predetermined upcoming time period, and stores the retrieved activation metadata in the memory, the metadata for a received message being less than an entirety of the received message; and
an activation agent that analyzes the stored retrieved activation metadata to determine a batch of messages in the scheduled sub-queue scheduled for delivery in a second predetermined upcoming time period that is a portion of the first predetermined upcoming time period, and stores the determined batch of messages in the active sub-queue.

12. The messaging system of claim 11, further comprising:
one or more additional message entities coupled to the activation metadata retrieval agent and the activation agent, each of the one or more additional message entities including a corresponding message sorter, a corresponding scheduled sub-queue, and a corresponding active sub-queue.

13. The messaging system of claim 11, wherein the first message entity is configured for messages directed to a particular consumer; and
the active sub-queue transmits any messages in the active sub-queue to the particular consumer in response to a request for messages from the particular consumer.

14. The messaging system of claim 11, wherein the first message entity is configured for messages directed to a topic, and a plurality of subscriber queues corresponds to a plurality of consumers that subscribe to the topic; and
the first message entity stores an indication of a received message directed to the topic in each of the plurality of subscriber queues.

15. The messaging system of claim 14, wherein any messages indicated in a subscriber queue corresponding to a particular consumer are transmitted to the particular consumer in response to a request for messages from the particular consumer.

16. The messaging system of claim 11, wherein the activation metadata retrieval agent organizes the retrieved activation metadata in a plurality of buckets in the memory, each bucket of the plurality of buckets having an associated time interval and containing retrieved activation metadata for messages having a scheduled delivery time within the associated time interval; and
the activation metadata retrieval agent organizes the retrieved activation metadata in a first bucket of the plurality of buckets into a plurality of batches, each batch of the plurality of batches including messages associated with a same message entity.

17. A computer readable storage medium having computer program instructions embodied in said computer readable storage medium for enabling a processor to process received messages, the computer program instructions comprising:
first computer program instructions that enable the processor to store received messages that include a scheduled delivery time in a scheduled sub-queue of a first message entity, and to store received messages that do not include a scheduled delivery time in an active sub-queue of the first message entity;
second computer program instructions that enable the processor to retrieve activation metadata for any messages stored in the scheduled sub-queue that include a scheduled delivery time within a first predetermined upcoming time period and store the retrieved activation metadata in the memory, the metadata for a received message being less than an entirety of the received message; and
third computer program instructions that enable the processor to analyze the stored retrieved activation metadata to determine a batch of messages in the scheduled sub-queue scheduled for delivery in a second predetermined upcoming time period that is a portion of the first predetermined upcoming time period, and store the determined batch of messages in an active sub-queue of the message entity.

18. The computer readable storage medium of claim 17, further comprising:
fourth computer program instructions that enable the processor to transmit any messages in the active sub-queue that to a particular consumer in response to a request for messages from the particular consumer.

19. The computer readable storage medium of claim 17, wherein the first message entity is configured for messages directed to a plurality of consumers, and a plurality of subscriber queues correspond to the plurality of consumers, the third computer program instructions comprising:
fourth computer program instructions that enable the processor to store an indication of a received message directed to the plurality of consumers in each of the plurality of subscriber queues.

20. The computer readable storage medium of claim 19, further comprising:
fifth computer program instructions that enable the processor to transmit any messages indicated in a subscriber queue corresponding to a particular consumer to the particular consumer in response to a request for messages from the particular consumer.

* * * * *